Figure 1:
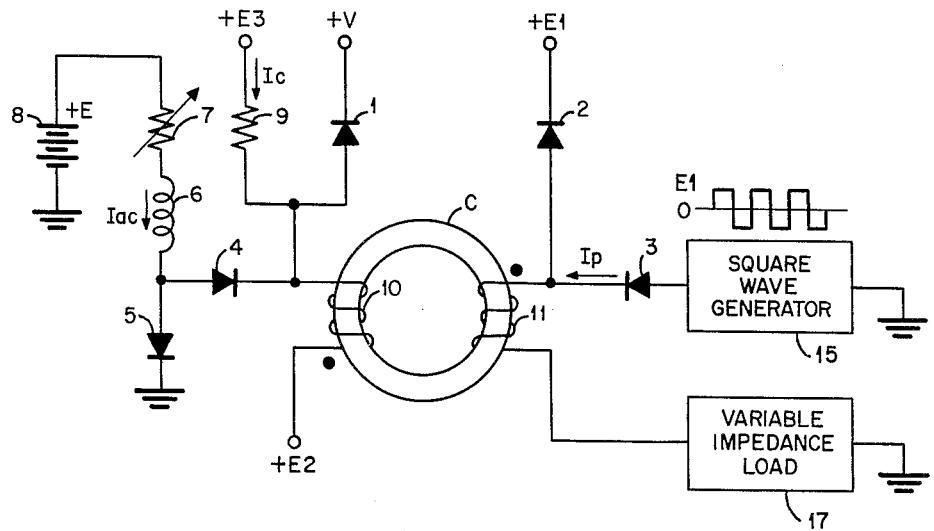

Aug. 29, 1961   J. D. LAWRENCE, JR   2,998,564
MAGNETIC CURRENT REGULATOR
Filed Sept. 3, 1957

INVENTOR.
JOSEPH D. LAWRENCE Jr.
ATTORNEY

United States Patent Office 2,998,564
Patented Aug. 29, 1961

2,998,564
MAGNETIC CURRENT REGULATOR
Joseph D. Lawrence, Jr., Oreland, Pa., assignor to Sperry Rand Corporation, New York, N.Y., a corporation of Delaware
Filed Sept. 3, 1957, Ser. No. 681,553
18 Claims. (Cl. 323—89)

This invention relates to an improved current limiter for limiting the peak amplitudes of current from a pulsating current source notwithstanding variations in a load connected thereto and/or the pulse source itself. More particularly, this invention relates to an improvement over the current regulator disclosed in my copending application S.N. 554,988, filed December 23, 1955, now Patent No. 2,957,125, and is a continuation in part thereof.

In my copending application S.N. 554,988 I obtained current limiting by inserting a variable reactor between a pulse source and the load driven thereby. The variable reactor employed comprised a magnetic core, preferably composed of a magnetic material having substantially rectangular hysteresis loop. Wound on this core was a bias winding and a power winding. The bias winding was connected to a direct current biasing source which biased the core *far* into saturation in one direction. The power winding on the core connected the load to the pulse source to be controlled. In the manner described in my copending application S.N. 544,988 each of the current peaks from the pulse source would drive the core from its bias point toward a saturation in the other direction whereby a flux change was generated. As the flux changed, the back E.M.F. induced in the power winding acted to limit the flow of load current and hence produced a current limiting action. As long as the driving voltage did not materially exceed the voltage requirement of the load only a small rate of flux change would occur in the core and only small current limiting action obtains. When, however, the driving voltage materially exceeded the voltage requirement of the load, a large rate of flux change occurred. On such an occasion the core is driven onto the substantially vertical portion of its hysteresis loop, whereby the back E.M.F. induced in the power winding is substantial and the current limiting action of the circuit is likewse substantial. Although current regulation obtained in this manner is suitable for most applications I have found that the saturation regions, i.e. horizontal portions of the hysteresis loops, of the best rectangular loop cores exhibit a distinct slope so that the power winding circuit will display a small yet troublesome inductance. This inductance causes a slight delay to be observed in the generation of the output pulse across the load.

In order to avoid this delay it is proposed herein that the core not be biased far into one of its saturation regions, but instead be normally biased to a point near one knee of its hysteresis loop during the interval between power pulses. Further, it is proposed that an additional bias current be automatically switched into the bias network whenever the power pulses to be controlled are applied to the load. Thus, the bias current may be considered as having two components; (1) a D.C. current, Ic, which provides a magnetizing force slightly greater than the coercive force of the core, and (2) a current, Iac, which is automatically switched into the biasing circuit in synchronism with the application of the power pulses to the power winding. The current Ic is continuously applied to the bias winding on the core and determines the operating point of the core on its hysteresis loop; i.e. this current Ic drives the core to a point of saturation near the knee of its hysteresis loop.

By dividing the bias current into two components as aforementioned, the shape of the hysteresis loop of the magnetic core becomes far less critical, and in fact need not have rectangular characteristics although it is to be preferred. In addition, since the core normally traverses only a small portion of hysteresis loop, the power winding thereon will appear as a very low inductive reactance and will not unduly delay the generation of an output across a load in series with the limiter and pulse source.

Accordingly, an object of this invention is to provide a simple yet effective device for limiting the output current of a pulse source.

An additional object of the invention is to provide a pulse current limiter that is small in size and reliable in operation.

Another object of this invention is to provide a fast acting current limiter.

Other objects and advantages of the present invention will become apparent upon a careful consideration of the following detailed description when read in conjunction with the attached drawings, in which FIGURE 1 is a schematic diagram of the invention.

Figure 2:
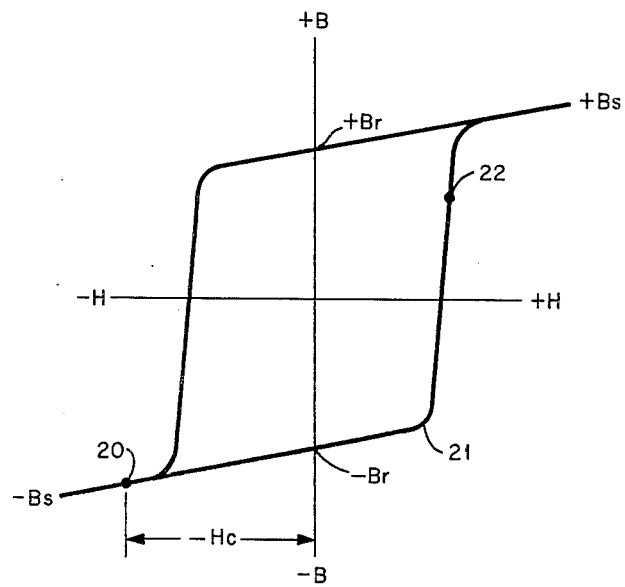

FIGURE 2 is a hysteresis loop useful in explaining the invention.

Referring now to FIGURE 1, it will be seen that the current limiter of this invention comprises a magnetic core C which preferably has a rectangular loop hysteresis characacteristic such as shown in FIGURE 2. The core C may be made of any number of magnetic materials such as 4–79 moly permalloy; etc. and it may take any number of geometric shapes. For purposes of illustration the core C is shown as a toroid. Wound around core C are the power winding 11 and the bias winding 10. The turns ratio of these windings is a matter of design and a turns ratio of unity may be used if desired. On the other hand a turns ratio other than unity may be preferred in certain instances.

In the circuit connections, power winding 11 is connected at one end through diode 3 to the power source 15 to be regulated. The other end of winding 11 is connected to a variable load shown at 17. For purposes of illustration source 15 is shown as an alternating current source which produces an output having a square wave shape, although other pulsating sources may be used. Diode 3 is included so that only the half cycles of one polarity of the square wave form may be applied to the core C and load 17. Also included in the power circuit is a voltage clamping diode 2 which is connected at its anode to the junction of diode 3 and winding 11 and is connected at its cathode to a source of potential of $+E1$ volts. As will later be shown clamping diode 2, which is not necessary to the invention but may improve performance, serves to limit the voltage swing developed across power winding 11 when the core C is driven onto the vertical portion of its hysteresis loop by a current surge from square wave generator 15.

If the load 17 varies in impedance, or if the generator 15 has variations in its output potential, or both, the pulses of purrent Ip tending to flow to the load 17 will vary in magnitude. In order to limit the amount of current Ip which may flow through load 17 without unduly delaying the transmission thereof a dual bias arrangement is connected to bias winding 10 of core C whereby said core and the power winding 11 thereon are made to selectively appear as a large impedance to high current from source 15. The first part of the bias network includes a source of potential $+E3$ connected through a series circuit comprising resistor 9 and bias winding 10 to potential source $+E2$ so that a small amount of current Ic flows through winding 10 from E3 to E2. Current Ic serves to bias the core C to an initial operating point which is near the knee of the hysteresis loop of the core (see point 20 FIGURE 2). Additionally, there is included, in the first part of the bias network a clamping diode 1 which is connected at its anode to the junction of elements 9 and 10 and at its cathode to a source of potential +V wherein the following voltage relationship exists: $E3>V>E2$. Clamping diode 1 limits the voltage swing which may be developed across bias winding 10 when the core C is reset to its operating point 20 (FIGURE 2) after a current surge from source 15.

The second part of the bias network coupled to bias winding 10 comprises a battery 8, or other source of electrical energy having a potential E, which is connected at its positive terminal to one end of variable resistor 7. Variable resistor 7 is in turn connected at its other end to the anodes of diodes 5 and 4 via an inductance 6. The cathode of diode 5 is connected to the other end of source 8 which is ground, and the cathode of diode 4 is connected to potential source +E2 via bias winding 10. It will be subsequently shown that in the absence of a current pulse from square wave generator 15 a current $Iac$ flows from battery 8 through resistor 7, inductor 6 and diode 5 in series. This current $Iac$ is prevented at this time from flowing through winding 10 by diode 4, since diode 4 is normally cut off by voltage +E2 which is applied to the cathode thereof. However, it will also be shown that diodes 5 and 4 together act as a switching arrangement whereby the current $Iac$ may be automatically routed through winding 10, instead of to ground, when a current pulse is applied to winding 11 by source 15. This additional current $Iac$ serves to further bias the core C when the aforesaid current pulse is applied.

Resistor 7 of the second part of bias network may be varied so that the additional bias current $Iac$ may be adjusted to any desired value and inductor 6 in series therewith serves to stabilize the current $Iac$ during operation of the circuit.

In operation, the current $Ic$ flowing through coil 10 produces and M.M.F., which in the absence of other magnetizing forces, drives the core C into the negative saturation region, for example, to point 20 of the hysteresis loop (FIG. 2). Current $Iac$ flows from battery 8 through elements 5, 6 and 7, and it will be appreciated since diode 4 is cut off that current $Iac$ will not normally flow through winding 10 and consequently will not produce an M.M.F. in the core C.

Each positive excursion of current ($Ip$) from source 15 flows through diode 3, winding 11 and load 17. When a pulse of current ($Ip$) flows from source 15 through coil 11, the condition of the core is shifted from point 20 to point 21. At this time, a small voltage is induced in coil 10. This voltage swings the upper terminal of winding 10 negative so as to render diode 4 conductive. When diode 4 is rendered conductive diode 5 is cut off and, therefore, the direct current $Iac$ from battery 8 now flows through diode 4 and winding 10 in the same direction as the current $Ic$. Current $Iac$ in combination with current $Ic$ establishes the maximum amount of load current ($Ip$) which can flow. The current ($Ip$) to be controlled is thus allowed to freely rise to an upper limit established by the regulating currents ($Ic$ and $Iac$) flowing through coil 10. Above this limit the M.M.F. produced by the pulse current $Ip$ exceeds that established by the regulating currents ($Ic$ and $Iac$) in coil 10, thereby causing the core C to traverse its hysteresis loop from point 21 to some position 22 along the vertical portion of the loop. In the region 21 to 22 a rapid change in flux may occur and a high back E.M.F. may be produced in coil 11 which opposes and limits the pulse current $Ip$ from source 15. During such time winding 11 exhibits a high impedance.

The magnitude of this back E.M.F. is limited to the positive voltage +E1 connected to the cathode of diode 2. A back E.M.F. greater than +E1 will cause diode 2 to be rendered conductive whereby the top of winding 11 will be clamped to +E1 volts.

At the end of the current pulse to be controlled the current $Ic$ which flows through resistor 9 and coil 10 at all times, produces a magnetizing force $Hc$ which in the absence of other magnetizing forces causes the core to return to point 20. When the core C transverses its hysteresis loop from point 22 back to 20, a back E.M.F. will be generated across winding 10. The magnitude of the E.M.F. produced when the core transverses its hysteresis loop to point 20 is limited to the positive voltage V connected to the cathode of diode 1. An E.M.F. greater than $+V-E2$ will cause diode 1 to be rendered conductive whereby the top of winding 10 will be clamped to +V volts.

While the invention has been shown in connection with a source 15 of square wave alternating current, the negative excursions of which have been removed by rectifier 3, it is obvious that the same could be equally applied to an alternating current in which both halves of the cycle are allowed to flow through coil 11. In the latter situation the regulating device will regulate the positive peaks of the current and allow the negative excursions to go through the device without regulation. Additionally, it will be appreciated that by employing two of the circuit limiters disclosed in the instant application that full wave current limiting is possible. In this case one current limiter controls the positive peaks of current whereas the other current limiter controls the negative peaks. Reference is herein made to FIGURE 3 of my co-pending patent application S.N. 554,988 which illustrates the general arrangement for construction a full wave current limiter.

I claim:

1. A current regulator comprising a saturable magnetic core, coil means on said core, first means for passing a direct current through said coil means, second means for selectively passing current through said coil means, wherein the magnetomotive forces produced by the said currents from said first and second means are additive, additional coil means on said core, means for passing a pulsating current to be controlled through said additional coil means, wherein the magnetomotive force produced by said pulsating current is in an opposite direction to that produced by the currents from said first and second means and wherein said means for passing a pulsating current is coupled to said second means to cause said second means to pass current through the first named coil means at selected time intervals.

2. A current regulator as defined in claim 1 in which the core is composed of a material having a substantially rectangular hysteresis loop.

3. A current regulator comprising a saturable magnetic core, coil means on the core, a variable impedance load coupled to said coil means, means for passing a pulsating current through said coil means and sail load, wherein said pulsating current produces a magnetizing force tending to saturate the core in a first direction, first control means for applying a biasing magnetizing force to the core so as to saturate it in a second direction and, second control means for applying a biasing magnetizing force tending to saturate the core in said second direction, said second control means being effective when said pulsating current passes through said coil means and said load.

4. The device as defined in claim 3 further including means for controlling the magnetizing force applied to core from said second control means.

5. The device as defined in claim 3 in which the core has a substantially rectangular hysteresis loop.

6. A current regulator comprising a saturable magnetic core, coil means on said core, a load, means for generating a train of spaced undirectional pulses, means feeding said pulses through said coil means to said load whereby said pulses produce a magnetizing force in one direction through said core, and means for effectively limiting the peak value of said pulses comprising first means for applying a magnetizing force to said core in a direction opposite to the magnetizing force due to said pulses, and second means for applying a magnetizing force to said core in the same direction as said first means in synchronism with the flow of said unidirectional pulses through said coil means.

7. The device as defined in claim 6 wherein said coil means comprises a first and second coil, said first and second means are coupled to said first coil and said means for generating a train of spaced pulses is coupled to said second coil.

8. The device as defined in claim 6 further comprising a unilateral conductor interposed between said first and second means.

9. The device as defined in claim 6 wherein said second means comprises control apparatus for varying the applied magnetizing force from said second means.

10. A current regulator comprising a saturable magnetic core, coil means on said core, bias means coupled to said coil means for causing a flux to be established in said core in a first direction, and pulsing means for passing a pulsating current through said coil means tending to establish a flux in a second direction in said core, said pulsing means controlling said biasing means whereby the flux produced by said biasing means is automatically increased each time said pulsing means causes current to pass through said coil means.

11. The current regulator defined in claim 10 further including a load means coupled to said coil means.

12. The current regulator defined in claim 10 wherein said coil means in cooperation with said saturable magnetic core offers a low impedance to currents below a predetermined magnitude from said pulsing means.

13. The current regulator defined in claim 12 wherein said coil means in cooperation with said saturable magnetic core offers a high impedance to currents above a predetermined magnitude from said pulsing means.

14. The current regulator defined in claim 12 further including means for varying the predetermined amount of current below which the coil means in cooperation with said saturable magnetic core acts as a low impedance to current from said pulsing means.

15. In a pulse translating system which includes a pulsating power source and a load circuit therefor; a current regulator comprising a saturable magnetic core, a first coil wound on said core connecting said pulsating power source to said load whereby said pulsating power source causes flux changes in one direction in said core, a second coil wound on said core, a variable bias supply coupled to said second coil for producing a small saturating flux in said core in a direction opposite to said one direction, and means for automatically increasing the effect of said bias supply whenever the flux change in said core due to said pulsating power source exceeds a predetermined value.

16. A current regulator comprising a saturable magnetic core having a substantially rectangular hysteresis characteristic exhibiting first and second flux saturation regions, a variable load impedance, generating means for generating a train of current pulses, a first coil wound on said core connected at one end to said generating means and connected at another end to said impedance whereby said generating means causes a current in said first coil tending to drive said core toward said first saturation region, a second coil wound on said core, a first source of bias current connected to said second coil for driving said core to the beginning of said second saturation region, a second source of bias current, and a switching means operable to connect said second source of bias current to said second coil thereby tending to drive said core further into said second saturation region when the current in said first coil exceeds a predetermined value.

17. A current regulator comprising a saturable magnetic core having a substantially rectangular hysteresis characteristic exhibiting first and second flux saturation regions, a variable load impedance, generating means for generating a train of current pulses, a first coil wound on said core connected at one end to said generating means and connected at another end to said impedance whereby said generating means causes a current in said first coil tending to drive said core toward said first saturation region, a second coil wound on said core inductively coupled to said first coil, a first source of bias current connected to said second coil for driving said core to the beginning of said second saturation region, a second source of bias current, a switching means operable to connect said second source of bias current to said second coil thereby tending to drive said core further into said second saturation region, said switching means comprising a first unilateral conductor connected to said second coil for switching current from said second source of bias current to said second coil and a second unilateral conductor for switching current from said second source away from said second coil, wherein said first unilateral conductor switches bias current to a second coil when the current in said first coil exceeds a predetermined value and said second unilateral conductor switches the bias current from said second source away from said second coil when the current pulses in said first coil are below said predetermined value.

18. The current regulator defined in claim 17 further comprising a first voltage clamping circuit connected to the juncture of said generating means and said first coil and a second voltage clamping circuit connected to the juncture of said first source of bias and said second coil.

References Cited in the file of this patent
UNITED STATES PATENTS

| | | |
|---|---|---|
| 2,792,507 | Eckert | May 14, 1957 |
| 2,820,151 | Steagall | Jan. 14, 1958 |
| 2,882,482 | Simkins | Apr. 14, 1959 |

UNITED STATES PATENT OFFICE

CERTIFICATE OF CORRECTION

Patent No. 2,998,564

August 29, 1961

Joseph D. Lawrence, Jr.

It is hereby certified that error appears in the above numbered patent requiring correction and that the said Letters Patent should read as corrected below.

Column 2, line 28, for "characateristic" read -- characteristic --; line 59, for "purrent" read -- current --; column 3, line 39, for "and" read -- an --; line 59, for "allowe" read -- allowed --; column 4, line 30, for "construction" read -- constructing --.

Signed and sealed this 23rd day of January 1962.

(SEAL)
Attest:

ERNEST W. SWIDER
Attesting Officer

DAVID L. LADD
Commissioner of Patents